United States Patent [19]

Knox

[11] Patent Number: 5,668,638

[45] Date of Patent: Sep. 16, 1997

[54] ERROR DIFFUSION METHOD WITH SYMMETRIC ENHANCEMENT

[75] Inventor: Keith T. Knox, Rochester, N.Y.

[73] Assignee: Xerox Corporation, Stamford, Conn.

[21] Appl. No.: 671,479

[22] Filed: Jun. 27, 1996

[51] Int. Cl.⁶ .................................................. H04N 1/40
[52] U.S. Cl. .......................... 358/298; 358/443; 382/270
[58] Field of Search ................................ 358/298, 443, 358/447, 448; 382/270, 271, 272, 273

[56] References Cited

U.S. PATENT DOCUMENTS

| | | | |
|---|---|---|---|
| 4,051,536 | 9/1977 | Roetling | 358/298 |
| 4,149,194 | 4/1979 | Holladay | 358/283 |
| 4,256,401 | 3/1981 | Fujimura et al. | 355/14 E |
| 4,625,222 | 11/1986 | Bassetti et al. | 346/160 |
| 4,633,327 | 12/1986 | Roetling | 358/283 |
| 4,672,463 | 6/1987 | Tomohisa et al. | 358/284 |
| 4,693,593 | 9/1987 | Gerger | 355/14 CH |
| 4,700,229 | 10/1987 | Herrmann et al. | 358/166 |
| 4,709,250 | 11/1987 | Takeuchi | 346/160 |
| 4,724,461 | 2/1988 | Rushing | 355/14 D |
| 5,045,952 | 9/1991 | Eschbach | 358/447 |
| 5,055,942 | 10/1991 | Levien | 358/456 |
| 5,317,653 | 5/1994 | Eschbach et al. | 382/50 |
| 5,363,209 | 11/1994 | Eschbach et al. | 358/445 |
| 5,467,201 | 11/1995 | Fan | 358/447 |
| 5,521,989 | 5/1996 | Fan | 382/270 |

OTHER PUBLICATIONS

Roetling, "Halftone Method With Edge Enhancement and Moire Suppression", J. Opt. Soc. Am. vol. 66, No. 10, Oct. 1976.

Floyd et al; "An Adaptive Algorithm for Spatial Greyscale"; Proceedings of the SID 17/2, 75–77 (1976).

Jarvis et al; "A Survey of Techniques for the Display of Continuous Tone Pictures on Bilevel Displays"; Computer Graphics and Image Processing, vol. 5, pp. 13–40, (1976).

Stucki, "MECCA—A Multiple Error Correction Computation Algorithm for BiLevel Image Hardcopy Reproduction"; IBM Res. Rep RZ1060 (1981).

Billotet-Hoffman et al. "On the Error Dissusion Technique for Electronic Halftoning"; Proceedings of the Society for Information Display, vol. 24, 1983.

*Primary Examiner*—Peter S. Wong
*Assistant Examiner*—Gregory J. Toatley, Jr.
*Attorney, Agent, or Firm*—Mark Costello

[57] ABSTRACT

A processing system for processing electronic images defined in terms of image signals, each image signal representing density at a discrete position within the electronic image, and quantizing image signals defined at "c" gray levels for use in a device requiring image signals defined at "d" levels, where "d" may be less than or equal to "c", the system including an image input receiving at least a portion of the electronic image as input signals; an error adding circuit, adding error signals determined from any previous thresholding processing to the input signals to generate corrected input signals; a thresholding processor, receiving corrected image signals defined at "c" levels, and quantizing the corrected image signals to "d" levels, by comparison to at least one threshold signal and outputting the corrected image signals at "d" levels as output signals; an image output, outputting output signals defined at "d" levels; a differencing circuit, generating a difference signal representative of the difference in image density between corresponding corrected input signals and the output signal; an error distribution circuit, receiving the difference signals, and directing weighted portions thereof to the error adding circuit for addition to subsequent image signals in a predetermined spatial relationship to the input signals; and a threshold modulation circuit, varying the threshold signals proportionally to the input image, and recursively varying the threshold signals in response to previous threshold signals.

13 Claims, 3 Drawing Sheets

ERROR DIFFUSION METHOD WITH SYMMETRIC ENHANCEMENT

The present invention relates generally to the representation of digital image data, and in particular, to the binary or multilevel representation of images for display purposes.

BACKGROUND OF THE INVENTION

Image information, be it color, black or white, is commonly generated in a bitmap format where the bitmap comprises a plurality of gray level pixels, i.e. pixels that are defined by digital values, each value representing a gray level among a number of gray levels. Thus, in an 8 bit system, 256 levels of gray are present, where each level represents an increment of gray between black and white. In the case of color bitmaps, where three defining colors or separations each include 256 levels of information, there may be more than 16 million colors defined by gray bitmaps.

Usually, bitmaps in such a gray level format are unprintable by standard printers. Standard printers print in a limited number of levels, either a spot or a no spot in the binary case, or a limited number of levels associated with the spot, for example, four in the quaternary case. Accordingly, it is necessary to reduce the gray level image data to a limited number of levels so that it is printed. Besides gray level information derived by scanning, computer graphics processes and other image processing methods may produce gray level images for reproduction.

One standard method of converting gray level pixel values to binary level pixel values is through the use of dithering or halftoning processes. In such arrangements, over a given area having a number of gray pixels therein, each pixel value of an array of gray level pixels within the area is compared to one of a set of preselected thresholds (the thresholds are stored as a dither matrix and the repetitive pattern generated by this matrix is considered a halftone cell) as taught, for example, in U.S. Pat. No. 4,149,194 to Holladay. The effect of such an arrangement is that, for an area where the image is gray, some of the thresholds within the dither matrix will be exceeded, i.e. the image value at that specific location is larger than the value stored in the dither matrix for that same location, while others are not. In the binary case, the pixels or cell elements for which the thresholds are exceeded might be printed as black, while the remaining elements are allowed to remain white, dependent on the actual physical quantity described by the data. The effect of the distribution of black and white over the halftone cell is integrated by the human eye as gray. Dithering or halftoning presents problems, however, in that the amount of gray within an original image is not maintained exactly over an area, because the finite number of elements inside each dither matrix—and therefore halftone cell—only allows the reproduction of a finite number of gray levels, i.e. number of elements in the cell plus one, or less. The error arising from the difference between the output pixel value and the actual gray level pixel value at any particular cell is simply thrown away. This results in a loss of image information. In particular, dithering introduces coarse quantization artifacts which are visible in the image areas where the scene has little variation. This is also known as "banding", and is caused by the limited number of output gray levels available. The "banding" artifacts generally increase with decreasing cell size, which is identical to a decrease in the number of levels that can be represented by the halftone cell.

In the ARIES (Alias Reduction and Image Enhancement System) method of halftone reproduction, described by P. Roetling in "Halftone Method With Enhancement and Moire' Suppression," J. Opt. Soc. Amer. Vol. 66, No. 10, pp. 985–989, October, 1976, image information initially has a set of halftone screen values for a cell added to the information. A uniform threshold value is applied to the screened information, to produce an output value. The average gray value over the cell area of the input image is compared to the average gray value over the cell area of the output image. See, also, U.S. Pat. No. 4,051,536 to Roetling and U.S. Pat. No. 4,633,327 to Roetling. In this way, the error between original and output is minimized over each halftone cell. The banding artifact, however, is not reduced.

Algorithms that convert gray images to binary or other number of level images attempting to preserve the local density exist, and include among them error diffusion, as taught, for example, in "An Adaptive Algorithm for Spatial Greyscale" by Floyd and Steinberg, Proceedings of the SID 17/2, 75–77 (1976) (hereinafter, "Floyd and Steinberg"). Additional modifications to the error diffusion algorithm taught by Floyd and Steinberg have been proposed, e.g.: a different weighting matrix, as taught, for example, in "A Survey of Techniques for the Display of Continuous Tone Pictures on Bilevel Displays" by Jarvis et al., Computer Graphics and Image Processing, Vol. 5., pp. 13–40 (1976)

"MECCA—A Multiple-Error Correction Computation Algorithm for Bi-Level Image Hardcopy Reproduction" by Stucki, IBM Res. Rep. RZ1060 (1981), also describes an error diffusion algorithm incorporating actual printer dot overlaps in the error calculation, thereby generating a better printable result.

U.S. Pat. No. 5,055,942 to Levien suggests another pixel based error diffusion scheme where the tendency of the individual dots to form clusters in a screened image can be varied by applying a hysteresis constant and recursion techniques known from adaptive screening, to allow adjustment of image coarseness by adjustment of the hysteresis constant. This method produces better images, particularly for electrophotographic printing than the original error diffusion algorithm, but the images tend to have reduced sharpness or detail resolution, as compared to Floyd and Steinberg. In implementation, the Levien method uses an error diffusion process, providing a feedback response based on the output image, and particularly, dot size. The resulting irregular placement of dots improves the number of gray shades which can be reproduced. However, the hysteresis function implemented to control the feedback response tends to dampen the response at edges.

U.S. Pat. No. 4,625,222 to Bassetti et al. discloses a print enhancement control system for an electrostatic copying machine wherein control logic circuitry processes a set of image altering parameters to improve image production quality. These parameters, whose values are either predetermined, fixed or have been received from an exterior source, improve image quality (i.e., resolution) by modifying modulated gray signals.

U.S. Pat. No. 4,700,229 to Herrmann et al. discloses an image enhancement circuit which converts a low quality image signal into a high quality image signal by modifying the binary representation of a picture. Image enhancement is accomplished by multiplying a series of error difference signals by a series of weighting factors k(i) which produce a clearer image by improving picture resolution.

U.S. Pat. No. 4,672,463 to Tomohisa et al. discloses a method to improve image quality within an electrostatic reproduction machine wherein the sharpness of an image is improved based on the value of an image sharpness control parameter that has been calculated examining the copy quality of an original.

U.S. Pat. No. 4,709,250 to Takeuchi discloses an image forming apparatus which improves the halftone image quality of an original. The pulse width of a reference control signal controls and improves image quality in response to a detected image density signal.

U.S. Pat. No. 4,724,461 to Rushing discloses an image improving process control for an electrostatic copying machine which maintains high image quality by adjusting a set of process control parameters.

U.S. Pat. No. 4,256,401 to Fujimura et al. discloses an image density adjustment method wherein a predetermined image density level within an electrostatic copying machine is maintained at a standard density by varying a set of input control parameters.

U.S. Pat. No. 4,693,593 to Gerger discloses a method of improving the image quality by controlling a single process parameter in response to changes in sensitometric characteristics of an image transfer member.

Modifications to the Floyd and Steinberg algorithm may, as shown by Billotet-Hoffman and Bryngdahl in the Proceedings of the Society for Information Display, Volume 24, 1983, "On the Error Diffusion Technique for Electronic Halftoning", include a varying threshold, a dither, instead of a fixed threshold. The adaptive nature of the Floyd and Steinberg algorithm automatically provides a sharp, edge-enhanced appearance which, while visually appealing, may not necessarily be desirable in the output image.

A difficulty with the Floyd and Steinberg error diffusion algorithm is that an inherent edge enhancement is built into the algorithm. Analysis of the output of the Floyd and Steinberg error diffusion algorithm illustrates a characteristic overshoot (too dark or too light) at upward and downward transitions, or steps, in the continuous tone digital image data. As used within this specification, continuous tone refers to input data that has been quantized to a larger number of discrete values than intended for the output data.

These systems, although providing some degree of image improvement, generally do not provide the means to control the edge enhancement of regions within the image. However, U.S. Pat. No. 5,045,952 to Eschbach, assigned to the same assignee as the present invention; serves to provide some image dependent edge enhancement. To that end, Eschbach describes a method of dynamically adjusting the threshold level of an error diffusion algorithm to selectively control the amount of edge enhancement introduced into the encoded output. The threshold level is selectively modified on a pixel by pixel basis and may be used to increase or decrease the edge enhancement of the output digital image, thus, more closely representing the original detail and edge sharpness of the continuous tone input image.

While the Eschbach approach produces good images, the linear input threshold modulation induces edge enhancements that are asymmetrical through the image. Most of the enhancement occurs on one side of the edge, which appears harsh to the eye.

Other references have attempted to address the directionality of error diffusion, include U.S. Pat. No. 5,521,989 to Fan, entitled "Balanced Error Diffusion System", and U.S. Pat. No. 5,467,201 to Fan, entitled "Iterative Error Diffusion". Neither of these references addresses the directionality of edge enhancement.

The above identified references are incorporated by reference for their teachings.

SUMMARY OF THE INVENTION

The present invention is directed to a method of quantization of gray images, which additionally provides symmetric edge enhancement.

A processing system for processing electronic images defined in terms of image signals, each image signal representing density at a discrete position within the electronic image, and quantizing image signals defined at "c" gray levels for use in a device requiring image signals defined at "d" levels, where "d" may be less than or equal to "c", said system comprising: an image input receiving at least a portion of the electronic image as input signals; an error adding circuit, adding error signals determined from any previous thresholding processing to said input signals to generate corrected input signals; a thresholding processor, receiving corrected image signals defined at "c" levels, and quantizing said corrected image signals to "d" levels, by comparison to at least one threshold signal and outputting said corrected image signals at "d" levels as output signals; an image output, outputting output signals defined at "d" levels; a differencing circuit, generating a difference signal representative of the difference in image density between corresponding corrected input signals and the output signal; an error distribution circuit, receiving said difference signals, and directing weighted portions thereof to said error adding circuit for addition to subsequent image signals in a predetermined spatial relationship to the input signals; and a threshold modulation circuit, varying the threshold signals proportionally to the input image, and recursively varying the threshold signals in response to previous threshold signals.

The invention provides an operation that effectively cancels the asymmetric edge enhancement of the edge enhanced error diffusion of U.S. Pat. No. 5,045,952 to Eschbach, and substitutes a more desirable symmetric edge enhancement.

Yet another aspect of the invention is the use of edge enhanced error diffusion to do symmetric edge enhancement on continuous tone images, including non-halftoning processes. In such processes, rather than quantizing pixels from M levels to N levels, where M>N, the process may simply convert pixels from one appearance to another while retaining the same number of levels. In U.S. Pat. No. 5,363,209 to Eschbach et al., an example of an edge enhancement error diffusion processor is illustrated, without requiring quantization to a lower number of levels defining each image signal or pixel.

BRIEF DESCRIPTION OF THE DRAWINGS

For a better understanding of the present invention, reference may be had to the accompanying drawings wherein the same reference numerals have been applied to like parts and wherein.

DESCRIPTION OF THE PREFERRED EMBODIMENT

Figure 1:
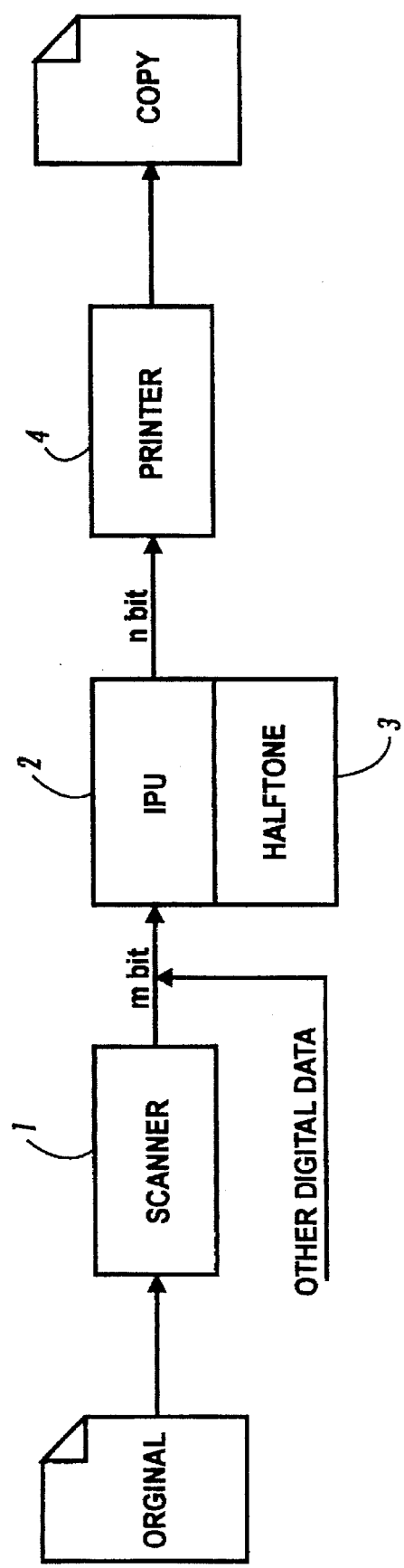
FIG. 1 is a functional block diagram illustrating a system in which the present invention may find use.

Referring now to the drawings where the showings are for the purpose of describing an embodiment of the invention and not for limiting same, a basic system for carrying out the present invention is shown in FIG. 1. In the present case, gray level image data from image input terminal (hereinafter, IIT) 1 may be characterized as image data or pixels, each pixel of which is defined at a single level or optical density in a set of 'c' optical density magnitudes or levels, the number of members in the set of levels often being larger than desired. The number of desired levels is given by the capabilities of printer 4, or by other system considerations. Each pixel from IIT 1 will be processed at image processing unit (hereinafter, IPU) 2 in the manner described hereinbelow, which has a halftoning processing 3 to redefine each pixel in terms of a new, possibly smaller set of 'd' magnitudes or levels. In this process, 'c' and 'd' are integer values representing pixel depth representing the magnitude of density. Here, color data may be represented by a number of independent channels or separations which are handled independently, or the color data might be represented as vector data in a predefined color space, e.g.: RGB, CIELab etc., being submitted to vector operations in the thresholding, error calculation and correction. One common case of this method includes the conversion of data from a relatively large set of gray level values to one of two legal or allowed bin values for printing in a binary printer 4. Another case of this is the conversion of data from a relatively large set of color data expressed as red, green and blue, or cyan, magenta, yellow and black, to one of five legal bin values for printing on printer 4, as described in U.S. Pat. No. 5,317,653.

Yet another case is the use of edge enhanced error diffusion to do edge enhancement on continuous tone images, including non-halftoning processes. In such processes, rather than quantizing pixels from c levels to d levels, where c>d, the process may simply convert pixels from one appearance to another while retaining the same number of levels. In U.S. Pat. No. 5,363,209 to Eschbach et al., an example of an edge enhancement error diffusion processor is illustrated, without requiring quantization to a lower number of levels defining each image signal or pixel. While the description will focus on the use of the invention in halftoning, it will be recognized that the case of c levels=d levels is well within the scope of the invention.

An input image of the type to be processed as hereinafter described may be represented by a set of gray values (gray level pixels) arranged in an array of L lines, each line containing N gray values with depth b, with any one pixel in said array denoted by I(n,l). Gray values are typically expressed as integers, with one example falling in the range from 0 to 255, although greater or lesser number of levels, as well as non-integer representations, are possible. An output image is considered to consist of pixels, each pixel corresponding to an output element that is printed by a digital printer or display. Gray does not refer to a specific color herein, but to a gradation of optical density.

Figure 2:
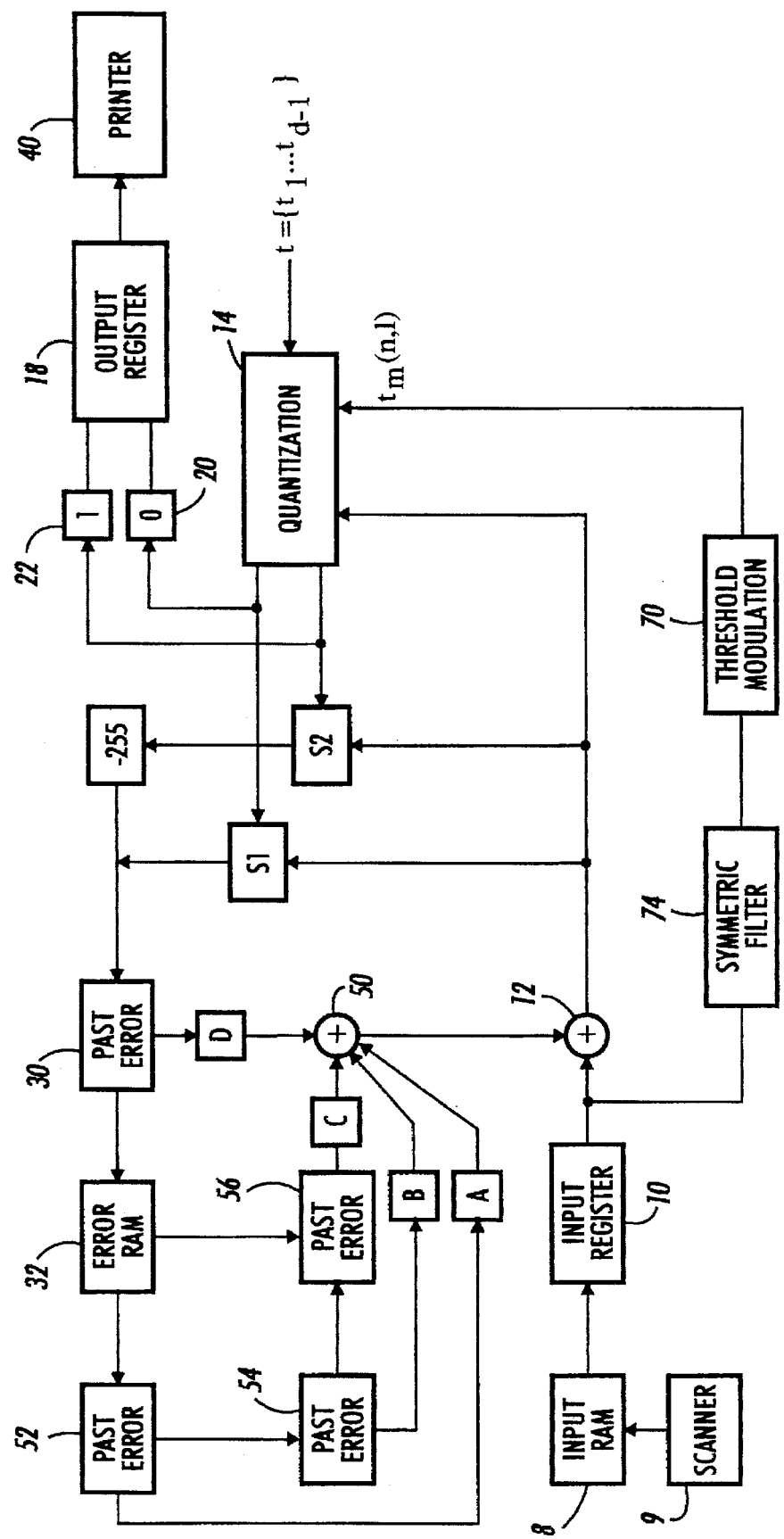
FIG. 2 is a block diagrams of the proposed system.

With reference to FIG. 2 which provide an example block diagram of the error diffusion process, a stored array of input image signals at input RAM 8, which may be from any image, including scanned images from a scanner 9 such as the Xerox 7650 Pro Imager or DocuSP scanner operated in accordance with suitable driver software or computer generated representations, directs input image I into the system on a signal by signal basis, where n,l represents the position of a single image signal I(n,l) in a stream of image signals. Such a scanner produces gray level signals or pixels, generally defined as multi-bit or N bit values, which define $2^N$ possible levels of optical density. (n,l) refers in this description to both the signal that is positioned at n,l in the image signal stream, and the optical intensity or density of the image signal at position n,l. Initially, a single signal I(n,l) is stored to input register 10 suitable for holding such a multi-bit signal. Each input signal has a corresponding error correction signal $\epsilon$ added to the image signal I(n,l) at adder 12, where $\epsilon$(n,l) is a sum of weighted error term signals of previous pixels to be added to I(n,l) resulting in a modified image signal. The modified image signal, the sum of the input image signal and the error correction signal of previous pixels (I(n,l)+$\epsilon$((n,l))), is passed to threshold comparator 14 to determine the corresponding output state $s_i$, where the drawing shows the case for two output states $s_1$ and $s_2$ for simplicity, although more output levels are possible. At threshold comparator 14, I(n,l)+$\epsilon$(n,l) is compared to the threshold signal t(n,l), which is a function, as will be described below of t={$t_1$ ... $t_{d-1}$}, which may be one or more values, depending on the value of d with respect to c, to determine an appropriate output signal B(n,l) for pixel I(n,l) such as, for example, for a binary output printing system, a spot or no spot. Responsive to this comparison, if the signal I(n,l)+$\epsilon$(n,l) is greater than the reference signal, then an image signal representing a single white spot is directed to output register 18 from RAM memory 20. If responsive to this comparison, signal I(n,l)+$\epsilon$(n,l) is less than the reference, then an image signal representing a single black spot is directed to output register 18 from RAM memory 22. If a white pixel is directed to output register 18, switch S1 is enabled to allow the modified input image signal I(n,l)+$\epsilon$(n,l) to be stored to error register 30 without alteration. If a black pixel is directed to output register 18, switch S2 is enabled to allow the modified input image signal I(n,l)+$\epsilon$(n,l) to be stored to error register 30, after having a value equal to black (255 in the 8 bit case) subtracted from the signal. Pixels stored to output register 18 are eventually output as printer output signals required by the imaging application, for example, binary printer 40. In the present case, the printer can be any binary printer, for example, the Xerox 4011 Printer (simple, low speed printer) or the Xerox DocuTech Model Production Printer 135 (a very complex, high speed printer).

Error determined in the quantization of pixels is stored at error RAM 32, until an image signal which requires the addition of error passes through the system. Then, the portion of the stored errors from previous quantization is directed to adder 50 from past error registers 52, 54, 56 and error register 30. Error registers 52, 54, 56 are connected to allow the error signal to be shifted from register to register as a line of data is directed through the described system. Error signals are directed through multipliers A, B, C and D, respectively, in accordance with Floyd and Steinberg type error diffusion, with a weighting scheme selected as desired. Note that the use of four error signals is for illustrative purposes only and that lesser or larger numbers might be used in the actual implementation.

To derive t(n,l), input image signal I(n,l), stored at input register 10, is directed to threshold modulation processor 70, as will be described further hereinbelow.

With an error diffusion process described, the principle of the invention will now be discussed. In threshold modulation, a spatially varying function is subtracted from the threshold (or equivalently, added to the input image). It can be shown that the process of modulating the threshold in this manner produces an output image that is exactly equal to the image produced by pre-filtering the input image and processing it with standard error diffusion. This equivalence is taught by K. Knox and R. Eschbach in "Threshold Modulation in Error Diffusion", J. Electronic Imaging, pp.

185–192, July 1993. The following description is shown using one-dimensional functions, but the extension to two-dimensional functions is clear.

The spectrum of the equivalent pre-filtered image is given by $$I_e(u)=I(u)+F(u)T(u) \quad (1)$$

where

F(u) is an asymmetric, high pass filter determined by the error diffusion weights, T(u) is the spectrum of the threshold modulation function, t(x), and I(u) is the spectrum of the input image i(x).

When T(u) is linearly proportional to the input image, T(u)=cI(u) then the equivalent input image becomes $$I_e(u)=I(u)[1+cF(u)] \quad (2)$$

Since F(u) is a high pass function, the equivalent input image $I_e(u)$ is an enhanced version on the input image, which has had its high spatial frequencies boosted by the filter F(u). The only difficulty is that because F(u) is asymmetric, the enhancement is asymmetric.

In this invention, a threshold modulation that is a filtered version of the input image is used, i.e.

$$T(u)=cI(u)S(u)/F(u) \quad (3)$$

where

S(u) is a symmetric high pass linear filter.

When substituted into equation 1, the equivalent input image therefore becomes, $$I_e(u)=I(u)[1+cS(u)] \quad (4)$$

thereby inducing a symmetric edge enhancement into the output image. Since the filtering effect of error diffusion has a DC component equal to 0, there are cases of this equation which will result in division by 0. That renders such an arrangement undesirable.

Then, the key to producing the threshold function shown in equation (2) is to apply the symmetric filter S(u), to the raw input image, and the asymmetric filter F(u) to the existing threshold modulation function. In such a process, we have eliminated division by 0. This can be seen by multiplying both sides of equation (3) by F(u), which yields $$F(u)T(u)=cI(u)S(u) \quad (5)$$

The standard asymmetric, high pass error diffusion filter function, F(u), can be defined in terms of coefficients $\beta_m$, $$F(u)=1-\Sigma\beta_m e^{-im u\Delta x} \quad (6)$$

When equation (6) is substituted into equation (5), the spectrum of the threshold function is given by, $$T(u)=S(u)I(u)+T(u)\Sigma\beta_m e^{-im u\Delta x} \quad (7)$$

In this equation, the edge enhancement constant, c, is assumed to be unity. To induce the enhancement corresponding to the constant c, the threshold function is multiplied by c, at a later step.

When the symmetric filter, S(u), is also a high-pass filter then it is defined in terms of coefficients $\alpha_m$ in the form, $$S(u)=1-\Sigma\alpha_m e^{-im u\Delta x} \quad (8)$$

Substituting equation (8) into equation (7), and transforming the spectral functions back into their corresponding image space functions enables a determination of the threshold function by implementing the following recursive equation.

$$t(x)=i(x)-\Sigma\alpha_m i(x-m\Delta x)+\Sigma\beta_m t(x-m\Delta x) \quad (9)$$

where i(x) is the input image, t(x) is the threshold modulation function, $\alpha_m$ are the coefficients for the symmetric filter, S(u), and $\beta_m$ are the coefficients for the asymmetric error diffusion filter, F(u).

The implementation of the threshold function to two-dimensions is straightforward and is given by, $$t(x,y)=i(x,y)-\Sigma\alpha_{nm}i(x-m\Delta x, y-n\Delta y)+\Sigma\beta_{nm}t(x-m\Delta x, y-n\Delta y) \quad (10)$$

This result shows that the threshold function, t(x), is determined from a symmetric filtering of input image data and an asymmetric filtering of the threshold function, itself. The symmetric filter may be both forward and backward looking. The asymmetric filter needs only to be backward looking, since its purpose is to cancel out the effects of the asymmetric error diffusion filter. After the threshold function, t(x), is determined from equation (10), the enhancement may be adjusted by multiplying the threshold function by the constant, c. If this constant is zero, then there will be no edge enhancement induced in the output image.

Figure 3:
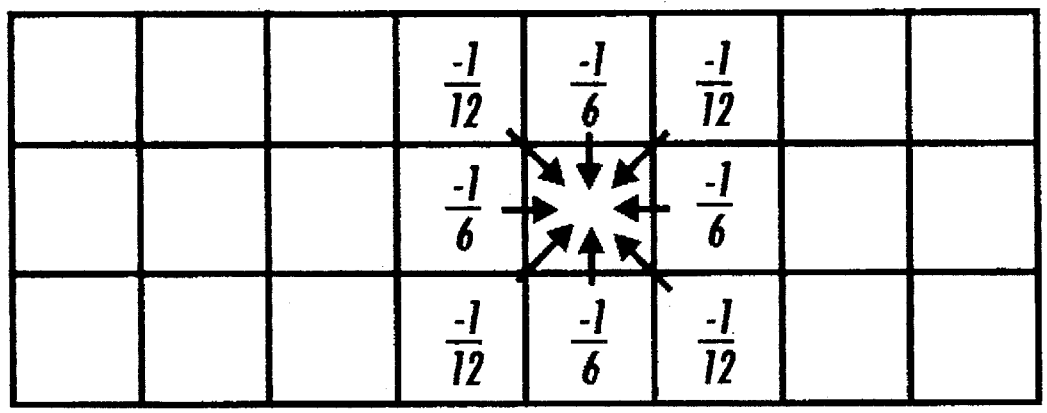
FIG. 3 illustrates the symmetric filter applied to the input image.
Figure 4:
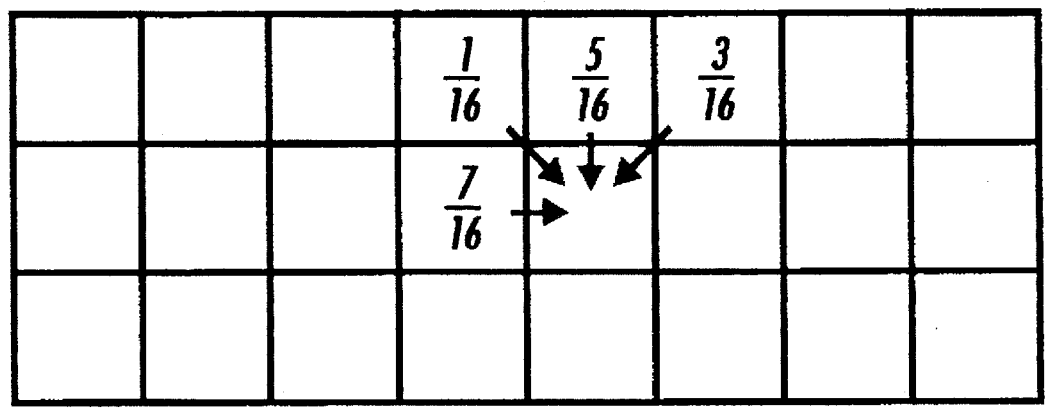
FIG. 4 illustrates the asymmetric filter that is applied to the threshold modulation function.

FIG. 3 shows the symmetric filter coefficients that are applied to the raw input image. FIG. 4 shows the asymmetric filter coefficients that are applied to the threshold filter. Note that the symmetric filter is non causal and requires knowledge of the image ahead of the current scan line. This is easily accomplished with an internal scanline buffer. On the other hand, the filter effected by the error diffusion process is causal and does not require knowledge of the filtered threshold modulation function ahead of the current scanline.

In considering the implementation of the present invention, and with reference back to FIG. 2, it can be seen that the threshold modulation function can be altered to meet the requirement of generating threshold values that cancel the asymmetrical response of the standard error diffusion filter. To that end, block 70 provides a threshold modulation function that will cancel the asymmetric effects of the error diffusion process. Note that the function t(x, y) is dependent on the image input i(x, y), and, because the function is recursive, is dependent on prior thresholds determined for neighboring pixels. Accordingly, in this implementation, a scanline buffer is assumed to be internal to symmetric filter function 74, for holding upcoming image input data, and a second scanline buffer is assumed to be internal to threshold modulation function 70, for storing prior threshold determinations.

The disclosed method may be readily implemented in software using object oriented software development environments that provide portable source code that can be used on a variety of computer or workstation hardware platforms. Alternatively, the disclosed data or structured document processing system may be implemented partially or fully in hardware using standard logic circuits or specifically on a single chip using VLSI design. Whether software or hardware is used to implement the system varies depending on the speed and efficiency requirements of the system and also the particular function and the particular software or hardware systems and the particular microprocessor or microcomputer systems being utilized. The document processing system, however, can be readily developed by those skilled in the applicable arts without undue experimentation from the functional description provided herein together with a general knowledge of the computer arts.

While this invention has been described in conjunction with a preferred embodiment thereof, it is evident that many alternatives, modifications, and variations will be apparent to those skilled in the art. Accordingly, it is intended to embrace all such alternatives, modifications and variations as fall within the spirit and broad scope of the appended claims.

I claim:

1. A processing system for processing electronic images defined in terms of image signals, each image signal representing density at a discrete position within the electronic image, and quantizing image signals defined at "c" gray levels for use in a device requiring image signals defined at "d" levels, where $c \geq d$, said system comprising:

an image input receiving at least a portion of the electronic image as input signals i(x);

an error adding circuit, adding error signals determined from any previous thresholding processing to said input signals to generate corrected input signals;

a thresholding processor, receiving corrected image signals defined at "c" levels, and quantizing said corrected image signals to "d" levels, by comparison to at least one threshold signal and outputting said corrected image signals at "d" levels as output signals;

an image output, outputting output signals defined at "d" levels;

a differencing circuit, generating a difference signal representative of the difference in image density between corresponding corrected input signals and the output signal;

an error distribution circuit, receiving said difference signals, and directing weighted portions thereof to said error adding circuit for addition to subsequent image signals in a predetermined spatial relationship to the input signals; and a threshold modulation circuit producing a threshold modulation signal t(x) driving the threshold processor to vary the threshold signal proportionally to the input image, and recursively vary the threshold signal in response to previous threshold modulation signals.

2. The system as defined in claim 1, wherein "d" is equal to two.

3. The system as defined in claim 1, wherein said threshold signal is varied in accordance with a filtering function:

$$T(u)=S(u)I(u)+T(u)\Sigma\beta_m e^{-imu\Delta x}$$

where, T(u) is the spectrum of the threshold modulation function, t(x), S(u) is a linear filter, I(u) is the spectrum of the input image i(x) and $\beta_m$ is the coefficients for the asymmetric error diffusion filter.

4. The system as defined in claim 3, wherein filter S(u) is a symmetric edge enhancement filter.

5. The systems as defined in claim 4, where said edge enhancement filter varies the input image signals in accordance with the filtering function:

$$S(u)=1-\Sigma\alpha_{nm}e^{-imu\Delta n-inv\Delta l}$$

Where $\Sigma\alpha_{nm}$ is a filter coefficient based on the contribution of the image signal to the threshold signal t(n,l).

6. The system as defined in claim 1, and including a scan line buffer, storing thresholds determined for a plurality of threshold determinations.

7. A method of processing electronic images defined in terms of image signals, each image signal representing density at a discrete position within the electronic image, and quantizing image signals defined at "c" gray levels for use in a device requiring image signals defined at "d" levels, where $c \geq d$ comprising:

receiving at least a portion of the electronic image as input signals;

adding error signals determined from any previous thresholding processing to said input signals to generate corrected input signals;

receiving corrected image signals defined at "c" levels, and quantizing said corrected image signals to "d" levels, by comparison to a threshold signal and outputting said corrected image signals at "d" levels as output signals;

outputting output signals defined at "d" levels;

generating a difference signal representative of the difference in image density between corresponding corrected input signals and the output signal;

receiving said difference signals, and directing weighted portions thereof to said error adding circuit for addition to subsequent image signals in a predetermined spatial relationship to the input signals; and varying the threshold signal proportionally to the input image, and recursively varying the threshold signal in response to previous threshold signals.

8. The method as defined in claim 7, wherein "d" is equal to two.

9. The method as defined in claim 7, wherein said threshold signal is varied in accordance with a filtering function:

$$T(u)=S(u)I(u)+T(u)\Sigma\beta_m e^{-imu\Delta x}$$

where, T(u) is the spectrum of the threshold modulation function, t(x), S(u) is a linear filter, I(u) is the spectrum of the input image i(x) and $\beta_m$ is the coefficients for the asymmetric error diffusion filter.

10. The method as defined in claim 9, wherein filter S(u) is a symmetric edge enhancement filter.

11. The method as defined in claim 10, where said edge enhancement filter varies the input image signals in accordance with the filtering function:

$$S(u)=1-\Sigma\alpha_{nm}e^{-imu\Delta n-inv\Delta l}$$

Where $\Sigma\alpha_{nm}$ is a filter coefficient based on the contribution of the image signal to the threshold signal t(n,l).

12. The method as defined in claim 7, including storing a plurality of scan lines of determined threshold signals, for use in the recursive thresholding process.

13. A error diffusion processing system for processing electronic images defined in terms of image signals, each image signal representing density at a discrete position within the electronic image, and quantizing image signals defined at "c" gray levels for use in a device requiring image signals defined at "d" levels, said system comprising:

an image input receiving at least a portion of the electronic image as input image signals;

an error adding circuit, receiving a thresholding processor, receiving corrected image signals defined at "c" levels, and quantizing said corrected image signals to "d" levels, by comparison to a threshold signal and outputting said corrected image signals at "d" levels as output signals;

an image output, outputting output signals defined at "d" levels a differencing circuit, generating a difference signal representative of the difference in image density between corresponding corrected input signals and the output signal;

an error distribution circuit, receiving said difference signals, and directing weighted portions thereof to said error adding circuit for addition to subsequent image signals in a predetermined spatial relationship to the input signals; and a threshold modulation circuit, varying the threshold signal proportionally to the input image, and recursively varying the threshold signal in response to previous threshold signals.

* * * * *